United States Patent
Chernichovski et al.

(10) Patent No.: US 6,818,881 B1
(45) Date of Patent: Nov. 16, 2004

(54) OPTICAL FILTER AND PASSIVE INFRARED DETECTOR ASSEMBLY

(75) Inventors: Nahum Chernichovski, Ramat Hasharon (IL); Gidon Levin, Rehovot (IL)

(73) Assignee: Visonic Ltd.,, Tel Aviv (IL)

( * ) Notice: Subject to any disclaimer, the term of this patent is extended or adjusted under 35 U.S.C. 154(b) by 0 days.

(21) Appl. No.: 09/464,546

(22) Filed: Dec. 15, 1999

(30) Foreign Application Priority Data

Apr. 22, 1999 (IL) .................................................. 129551

(51) Int. Cl.$^7$ ................................................. H01J 5/16
(52) U.S. Cl. .................. 250/216; 250/221; 250/339.14; 359/356
(58) Field of Search ................................. 250/216, 221, 250/342, 353, 339.14; 359/355–361; 340/555, 556, 567

(56) References Cited

U.S. PATENT DOCUMENTS

| | | | |
|---|---|---|---|
| 4,012,232 A | * | 3/1977 | Uhlmann et al. ........... 106/429 |
| 4,321,594 A | | 3/1982 | Galvin et al. ............... 340/567 |

FOREIGN PATENT DOCUMENTS

| | | |
|---|---|---|
| JP | 62-197725 | 9/1987 |

OTHER PUBLICATIONS

Manasso et al., "Stabilization of Polyolefins for Weather Resistance," *Additives for Plastic*, vol. 2, Raymond B. Semor Ed., Academic Press, pp. 93–94, (1978).

\* cited by examiner

*Primary Examiner*—Que T. Le
*Assistant Examiner*—Thanh X. Luu
(74) *Attorney, Agent, or Firm*—Marshall, Gerstein & Borun.

(57) ABSTRACT

An optical element including a substrate which is generally transparent to infrared radiation in a wavelength range of 5–16 $\mu$m, a pigment disposed in the substrate in an amount that does not generally decrease transmission of the infrared radiation, the pigment being generally non-transmissive to at least one of visible and ultraviolet light, the pigment being reactable with the substrate over time to create a reaction product which can decrease transmission of the infrared radiation, and a protective agent disposed in the substrate in an amount that does not generally decrease transmission of the infrared radiation and which generally prevents creation of the reaction product which can decrease transmission of the infrared radiation. The optical element may be a lens for a passive infrared detector assembly, for example.

36 Claims, 1 Drawing Sheet

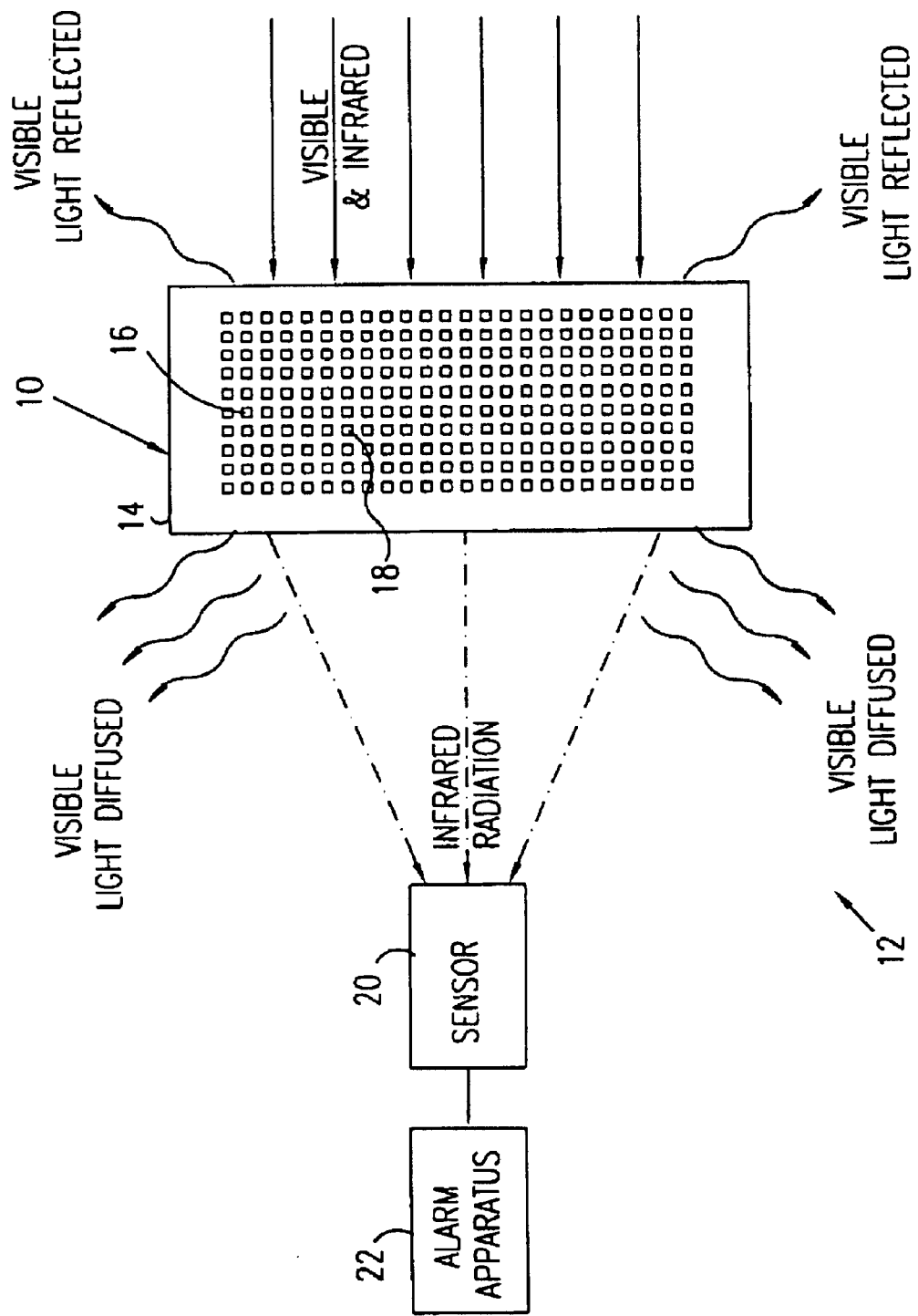

OPTICAL FILTER AND PASSIVE INFRARED DETECTOR ASSEMBLY

FIELD OF THE INVENTION

The present invention relates generally to passive infrared detectors and particularly to a protective agent for windows or lenses which are required to be transmissive to infrared radiation and diffuse, absorbent or reflective to visible and/or ultraviolet light, wherein the protective agent prevents a degradation in infrared transmission over time, even when exposed to sunlight.

BACKGROUND OF THE INVENTION

In a passive infrared detector, infrared radiation is generally focused onto an infrared sensor which provides an output signal indicative of the level of received infrared radiation. It is desired to allow infrared energy to pass through to the infrared sensor while blocking passage thereto of visible or ultraviolet light. Accordingly, passive infrared detectors generally employ lenses or windows made of polyethylene, particularly high density polyethylene (HDPE), since polyethylene is generally transparent to infrared energy in the wavelength range of 5–16 $\mu$m. An example of such a passive infrared detector is described in U.S. Pat. No. 4,321,594 to Galvin et al., the disclosure of which is incorporated herein by reference.

Recently pigments have been added to the polyethylene window or lens, or pigmented or colored filters have been placed between the window or lens and the infrared sensor, or mirrors have been coated with pigments. One reason, inter alia, for the pigment addition is that it provides the passive detectors with an aesthetic appearance and gives the window or lens a similar hue as the detector housing. Another reason is that the bare polyethylene is prone to passage therethrough of certain kinds of spurious visible light, such as light from halogen lamps, for example from the headlights of a passing vehicle. The pigment addition can help prevent the spurious light from passing through to the infrared sensor and thus prevent false alarms. Several standards have been adopted which set the engineering requirements for such pigment additions (for prevention of false alarms) including European Standard EN 50131-2-2 (1993), Section 9.5.4, International Standard IEC 839-2-6-1990, Section 6.2.5, British Standard LPS 1169 Issue 2 (June 1992) Section 8.2.9, and Canadian Standard ULC-S-306-M89 Section 8.8.6.

The pigment addition ideally should diffuse, reflect or absorb light in the visible and/or UV range, and thereby prevent passage therethrough to the infrared sensor, while at the same time allow passage therethrough of infrared radiation. In practice, pigments are selected which have the above electromagnetic wave transmissive charateristics, and/or have a particle size that diffuses visible light while passing through infrared radiation.

It is desirable to mix the pigment with the raw polyethylene material. The pigment should not cause a degradation in the transmissive or mechanical properties of the polyethylene. Zinc sulfide (ZnS) has been found to be a particularly suitable pigment which provides a satisfactory combination of diffusion of visible and ultraviolet light and unobstructed transmission of infrared radiation, and which can be mixed with the raw polyethylene material.

However, a problem exists with ZnS and similar pigments in that over time, particularly with exposure to sunlight, the pigment reacts with polyethylene and creates reaction products which absorb infrared radiation in the wavelength range of 5–16 $\mu$m. (For example, in the case of ZnS, an undesirable infrared absorption band develops over time in the range of about 6–10 $\mu$m.) These reaction products reduce the amount of infrared radiation which reaches the sensor and thus cause a degradation in the passive detector performance.

SUMMARY OF THE INVENTION

The present invention seeks to solve the abovementioned problem of the prior art. Specifically, the present invention provides a protective agent for windows, filters or lenses which are required to be transmissive to infrared radiation and diffuse, absorbent or reflective to visible and/or ultraviolet light, wherein the protective agent prevents a degradation in infrared transmission over time, even when exposed to sunlight.

There is thus provided in accordance with a preferred embodiment of the present invention an optical element including a substrate which is generally transparent to infrared radiation in a wavelength range of 5–16 $\mu$m, a pigment disposed in the substrate in an amount that does not generally decrease transmission of the infrared radiation, the pigment being generally non-transmissive to at least one of visible and ultraviolet light, the pigment being reactable with the substrate over time to create a reaction product which can decrease transmission of the infrared radiation, and a protective agent disposed in the substrate in an amount that does not generally decrease transmission of the infrared radiation and which generally prevents creation of the reaction product which can decrease transmission of the infrared radiation. The optical element may be a lens for a passive infrared detector assembly, for example.

In accordance with a preferred embodiment of the present invention the protective agent is disposed in the substrate or mixed with the pigment.

In accordance with an alternatively preferred embodiment of the present invention the pigment is coated with the protective agent such that the pigment generally does not contact the substrate.

Further in accordance with a preferred embodiment of the present invention the pigment has a property of oxidizing the substrate so as to create an oxidation product which can decrease transmission of the infrared radiation, and the protective agent has a property of reacting with the pigment so as to prevent the pigment from oxidizing the substrate, and wherein the protective agent is mixed with the substrate and the pigment in an amount sufficient to generally prevent oxidation of the substrate by the pigment.

Still further in accordance with a preferred embodiment of the present invention the protective agent is pigmentary. Alternatively, the protective agent may be non-pigmentary.

In accordance with a preferred embodiment of the present invention the substrate includes polyethylene or high density polyethylene.

Additionally in accordance with a preferred embodiment of the present invention the pigment includes zinc sulfide.

Further in accordance with a preferred embodiment of the present invention the protective agent includes zinc oxide (ZnO). It is noted that although ZnO is less efficient than ZnS as an opacifier of polyethylene, ZnO is a stronger ultraviolet absorber and has been presumed to dissipate much of the absorbed energy thermally (see J. A. Manasso and W. S. Castor, Jr., "Additives for Plastic", Vol. 2, Raymond B. Semor Ed., Academic Press, 1978, p. 93).

In accordance with a preferred embodiment of the present invention the amount of the pigment relative to the amount of the protective agent is in a range between 1:4 and 4:1 inclusive.

Further in accordance with a preferred embodiment of the present invention the pigment and the protective agent include particles in a size range of 0.5–6 μm.

There is also provided in accordance with a preferred embodiment of the present invention a passive infrared detector assembly including an optical filter including a substrate which is generally transparent to infrared radiation in a wavelength range of 5–16 μm, a pigment disposed in the substrate in an amount that does not generally decrease transmission of the infrared radiation, the pigment being generally non-transmissive to at least one of visible and ultraviolet light, the pigment being reactable with the substrate over time to create a reaction product which can decrease transmission of the infrared radiation, and a protective agent disposed in the substrate an amount that does not generally decrease transmission of the infrared radiation and which generally prevents creation of the reaction product which can decrease transmission of the infrared radiation, an infrared sensor positioned relative to the substrate such that infrared radiation can impinge upon the sensor after passing through the optical element, the sensor providing an output signal indicative of received infrared radiation, and alarm apparatus operatively connected to the sensor which produces an alarm signal based upon the output signal of the sensor.

BRIEF DESCRIPTION OF THE DRAWINGS

The present invention will be understood and appreciated more fully from the following detailed description, taken in conjunction with the drawing in which:

The FIGURE is a simplified pictorial illustration of an optical filter and a passive infrared detector assembly constructed and operative in accordance with a preferred embodiment of the present invention.

DETAILED DESCRIPTION OF A PREFERRED EMBODIMENT

Reference is now made to the FIGURE which illustrates an optical element 10 and a passive infrared detector assembly 12 constructed and operative in accordance with a preferred embodiment of the present invention. The term "optical element" includes a filter, lens, mirror, window, etc.

Optical element 10 includes a substrate 14 which is generally transparent to infrared radiation in a wavelength range of 5–16 μm, and is preferably generally transmissive to visible and/or ultraviolet light. A preferred material for constructing substrate 14 is polyethylene and particularly HDPE.

A pigment 16 is preferably mixed in substrate 14 in an amount that does not generally decrease transmission of infrared radiation. The pigment 16 may have a property of reacting with substrate 14 over time to create a reaction product which can decrease transmission of infrared radiation. For example, pigment 16 may comprise zinc sulfide. As mentioned hereinabove, ZnS, when radiated, reacts with polyethylene and creates reaction products which absorb infrared radiation in the wavelength range of about 6–10 μm. It is believed that upon illumination of ZnS by visible light, ZnS becomes energized and oxidizes polyethylene. This oxidation produces oxidation products which can decrease transmission of infrared radiation.

In a preferred embodiment of the present invention a protective agent 18 is mixed in substrate 14 having a property such that the protective agent 18 is reactable with pigment 16 to prevent creation of the reaction product which, after illumination, can decrease transmission of infrared radiation. If pigment 16 is ZnS, then protective agent 18 is most preferably zinc oxide (ZnO) which can be mixed with raw polyethylene material. The inventors have found that by mixing ZnS with ZnO, creation of reaction products which can decrease transmission of infrared radiation is generally reduced and, in some cases, even substantially prevented. It is believed that ZnO has a property of being more affinitive to reaction with the energized ZnS than the oxidation reaction of energized ZnS and polyethylene, with the result that the ZnS reacts with the ZnO present in the polyethylene, instead of oxidizing the polyethylene. The product of reaction of ZnS and ZnO does not generally decrease transmission of infrared radiation. In this manner the problem of the prior art is solved, i.e., the addition of protective agent 18 does not generally decrease transmission of infrared radiation, while at the same time any possible unwanted reaction of pigment 16 with substrate 14 is prevented.

It has been found that the present invention can be advantageously carried out with a proportion of the amount of pigment 16 relative to the amount of protective agent 18 in a range between 1:4 and 4:1 inclusive, and wherein the pigments 16 and 18 include particles in a size range of 0.5–6 μm. It should be emphasized, however, that the foregoing description merely describes a preferred embodiment, and that the present invention is not limited to these materials.

Alternatively, the present invention can be carried out by coating pigment 16 with protective agent 18. It is believed that the adverse reaction between substrate 14 and pigment 16 occurs because pigment 16 comes into contact with substrate 14. By coating pigment 16 with protective agent 18, pigment 16 is prevented from contacting substrate 14 and the adverse reactions cannot occur. One example of such a coated embodiment would be coating ZnS particles with ZnO.

It is noted that protective agent 18 may be pigmentary (such as in the case of ZnO) or non-pigmentary, i.e., non-colored.

Passive infrared detector assembly 12 preferably also includes an infrared sensor 20 positioned relative to substrate 14 such that infrared radiation can impinge upon sensor 20 after passing through optical element 10. Sensor 20 provides an output signal indicative of the received infrared radiation. Alarm apparatus 22 is preferably operatively connected to sensor 20, and produces an alarm signal based upon the output signal of sensor 20. Sensor 20 and alarm apparatus 22 are well known in the art and readily available from several manufacturers, and as such require no further description to the skilled artisan.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. An optical element comprising:
   a substrate which is transparent to infrared radiation in a wavelength range of 5–16 μm;
   a pigment disposed in said substrate in an amount that does not decrease transmission of said infrared radiation, said pigment being non-transmissive to at least one of visible and ultraviolet light, said pigment being reactable with said substrate over time to create a reaction product which can decrease transmission of said infrared radiation; and a protective agent disposed in said substrate in an amount that does not decrease transmission of said infrared radiation and which prevents creation of the reaction product which can decrease transmission of said infrared radiation.

2. The optical element according to claim 1 wherein said protective agent is mixed with said pigment.

3. The optical element according to claim 1 wherein said pigment is coated with said protective agent such that said pigment does not contact said substrate.

4. The optical element according to claim 1 wherein said pigment has a property of oxidizing said substrate so as to create an oxidation product which can decrease transmission of said infrared radiation, and said protective agent has a property of reacting with said pigment so as to prevent said pigment from oxidizing said substrate, and wherein said protective agent is mixed with said substrate and said pigment in an amount sufficient to prevent oxidation of said substrate by said pigment.

5. The optical element according to claim 1 wherein said substrate comprises polyethylene.

6. The optical element according to claim 1 wherein said substrate comprises high density polyethylene.

7. The optical element according to claim 1 wherein said pigment comprises zinc sulfide.

8. The optical element according to claim 1 wherein said protective agent comprises zinc oxide.

9. The optical element according to claim 1 wherein the amount of said pigment relative to the amount of said protective agent is in a range between 1:4 and 4:1 inclusive.

10. The optical element according to claim 1 wherein said pigment and said protective agent comprise particles in a size range of 0.5–6 μm.

11. The optical element according to claim 1 wherein said protective agent is pigmentary.

12. The optical element according to claim 1 wherein said protective agent is non-pigmentary.

13. A passive infrared detector assembly comprising:
    an optical element comprising:
        a substrate which is transparent to infrared radiation in a wavelength range of 5–16 μm;
        a pigment disposed in said substrate in an amount that does not decrease transmission of said infrared radiation, said pigment being non-transmissive to at least one of visible and ultraviolet light, said pigment being reactable with said substrate over time to create a reaction product which can decrease transmission of said infrared radiation; and
        a protective agent disposed in said substrate in an amount that does not decrease transmission of said infrared radiation and which prevents creation of the reaction product which can decrease transmission of said infrared radiation;
    an infrared sensor positioned relative to said substrate such that infrared radiation can impinge upon said sensor after passing through said optical element, said sensor providing an output signal indicative of received infrared radiation; and
    alarm apparatus operatively connected to said sensor which produces an alarm signal based upon the output signal of said sensor.

14. The assembly according to claim 13 wherein said protective agent is mixed with said pigment.

15. The assembly according to claim 13 wherein said pigment is coated with said protective agent such that said pigment does not contact said substrate.

16. The assembly according to claim 13 wherein said pigment has a property of oxidizing said substrate so as to create an oxidation product which can decrease transmission of said infrared radiation, and said protective agent has a property of reacting with said pigment so as to prevent said pigment from oxidizing said substrate, and wherein said protective agent is mixed with said substrate and said pigment in an amount sufficient to prevent oxidation of said substrate by said pigment.

17. The assembly according to claim 13 wherein said substrate comprises polyethylene.

18. The assembly according to claim 13 wherein said substrate comprises high density polyethylene.

19. The assembly according to claim 13 wherein said pigment comprises zinc sulfide.

20. The assembly according to claim 13 wherein said protective agent comprises zinc oxide.

21. The assembly according to claim 13 wherein the amount of said pigment relative to the amount of said protective agent is in a range between 1:4 and 4:1 inclusive.

22. The assembly according to claim 13 wherein said pigment and said protective agent comprise particles in a size range of 0.5–6 μm.

23. The assembly according to claim 13 wherein said protective agent is pigmentary.

24. The assembly according to claim 13 wherein said protective agent is non-pigmentary.

25. A lens for a passive infrared detector assembly, the lens comprising:
    a substrate which is transparent to infrared radiation in a wavelength range of 5–16 μm;
    a pigment disposed in said substrate in an amount that does not decrease transmission of said infrared radiation, said pigment being non-transmissive to at least one of visible and ultraviolet light, said pigment being reactable with said substrate over time to create a reaction product which can decrease transmission of said infrared radiation; and
    a protective agent disposed in said substrate in an amount that does not decrease transmission of said infrared radiation and which prevents creation of the reaction product which can decrease transmission of said infrared radiation.

26. The lens according to claim 25 wherein said protective agent is mixed with said pigment.

27. The lens according to claim 25 wherein said pigment is coated with said protective agent such that said pigment does not contact said substrate.

28. The lens according to claim 25 wherein said pigment has a property of oxidizing said substrate so as to create an oxidation product which can decrease transmission of said infrared radiation, and said protective agent has a property of reacting with said pigment so as to prevent said pigment from oxidizing said substrate, and wherein said protective agent is mixed with said substrate and said pigment in an amount sufficient to prevent oxidation of said substrate by said pigment.

29. The lens according to claim 25 wherein said substrate comprises polyethylene.

30. The lens according to claim 25 wherein said substrate comprises high density polyethylene.

31. The lens according to claim 25 wherein said pigment comprises zinc sulfide.

32. The lens according to claim 25 wherein said protective agent comprises zinc oxide.

33. The lens according to claim 25 wherein the amount of said pigment relative to the amount of said protective agent is in a range between 1:4 and 4:1 inclusive.

34. The lens according to claim 25 wherein said pigment and said protective agent comprise particles in a size range of 0.5–6 μm.

35. The lens according to claim 25 wherein said protective agent is pigmentary.

36. The lens according to claim 25 wherein said protective agent is non-pigmentary.

* * * * *